(12) United States Patent
Foss et al.

(10) Patent No.: US 8,032,234 B2
(45) Date of Patent: Oct. 4, 2011

(54) DIAGNOSTICS IN PROCESS CONTROL AND MONITORING SYSTEMS

(75) Inventors: Scot R. Foss, Eden Prairie, MN (US); Terry A. Cureton, Plymouth, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/435,233

(22) Filed: May 16, 2006

(65) Prior Publication Data

US 2007/0270982 A1 Nov. 22, 2007

(51) Int. Cl.
| | |
|---|---|
| *B60Q 1/00* | (2006.01) |
| *G01D 1/00* | (2006.01) |
| *G01M 3/02* | (2006.01) |
| *G01F 1/00* | (2006.01) |
| *G01N 11/00* | (2006.01) |
| *G01N 11/04* | (2006.01) |
| *G01N 11/06* | (2006.01) |
| *G04F 8/00* | (2006.01) |
| *G05B 11/01* | (2006.01) |
| *G06F 17/18* | (2006.01) |
| *G06F 17/40* | (2006.01) |
| *G06F 19/00* | (2011.01) |
| *G08B 23/00* | (2006.01) |

(52) U.S. Cl. ............... 700/26; 700/12; 700/14; 700/110; 73/37; 73/53.04; 73/54.11; 73/54.13; 73/54.14; 73/861; 340/457.4; 340/500; 702/127; 702/128; 702/176; 702/178; 702/180; 702/186

(58) Field of Classification Search .................... 700/12, 700/14, 29, 110, 26; 702/128, 177, 178, 702/180, 187, 127, 176; 340/457.4, 309.16, 340/500; 73/37, 53.04, 54.11, 54.13, 54.14, 73/861

See application file for complete search history.

(56) References Cited

U.S. PATENT DOCUMENTS

| 5,665,899 | A | | 9/1997 | Willcox | 73/1.63 |
|---|---|---|---|---|---|
| 5,710,723 | A | * | 1/1998 | Hoth et al. | 702/181 |
| 5,746,511 | A | | 5/1998 | Eryurek et al. | 374/2 |
| 5,828,567 | A | | 10/1998 | Eryurek et al. | 700/79 |
| 5,838,561 | A | | 11/1998 | Owen | 364/152 |
| 5,905,648 | A | * | 5/1999 | Badami | 700/55 |
| 5,941,918 | A | * | 8/1999 | Blosser | 701/29 |
| 5,956,663 | A | | 9/1999 | Eryurek | 702/183 |

(Continued)

FOREIGN PATENT DOCUMENTS

EP 1345182 A2 9/2003

(Continued)

OTHER PUBLICATIONS

U.S. Appl. No. 09/972,078, filed Oct. 5, 2001; titled "Root Cause Diagnostics".

(Continued)

*Primary Examiner* — Albert Decady
*Assistant Examiner* — Jennifer Norton
(74) *Attorney, Agent, or Firm* — Westman, Champlin & Kelly, P.A.

(57) ABSTRACT

A condition of an industrial process is diagnosed based upon process variable information related to a value of a measured process variable. Histogram information is calculated based upon the determined process variable information and time information related to a duration of time the measured process variable has the value. Condition of the industrial process is diagnosed based upon the calculated histogram information.

31 Claims, 8 Drawing Sheets

U.S. PATENT DOCUMENTS

| | | | | |
|---|---|---|---|---|
| 5,973,963 | A * | 10/1999 | Sugawara | 365/185.23 |
| 6,017,143 | A | 1/2000 | Eryurek et al. | 700/51 |
| 6,047,220 | A | 4/2000 | Eryurek | 700/28 |
| 6,119,047 | A | 9/2000 | Eryurek et al. | 700/28 |
| 6,141,629 | A * | 10/2000 | Yamamoto et al. | 702/187 |
| 6,339,737 | B1 | 1/2002 | Yoshimura et al. | 701/50 |
| 6,356,191 | B1 | 3/2002 | Kirkpatrick et al. | 340/501 |
| 6,370,448 | B1 | 4/2002 | Eryurek | 700/282 |
| 6,397,114 | B1 | 5/2002 | Eryurek et al. | 700/51 |
| 6,427,102 | B1 * | 7/2002 | Ding | 701/34 |
| 6,434,504 | B1 | 8/2002 | Eryurek et al. | 702/130 |
| 6,449,574 | B1 | 9/2002 | Eryurek et al. | 702/99 |
| 6,472,710 | B2 | 10/2002 | Terashima | 257/343 |
| 6,505,517 | B1 | 1/2003 | Eryurek et al. | 73/861.08 |
| 6,519,546 | B1 | 2/2003 | Eryurek et al. | 703/130 |
| 6,532,392 | B1 | 3/2003 | Eryurek et al. | 700/54 |
| 6,539,267 | B1 | 3/2003 | Eryurek et al. | 700/51 |
| 6,556,145 | B1 | 4/2003 | Kirkpatrick et al. | 340/870.17 |
| 6,594,603 | B1 | 7/2003 | Eryurek et al. | 702/104 |
| 6,601,005 | B1 | 7/2003 | Eryurek et al. | 702/104 |
| 6,611,775 | B1 | 8/2003 | Coursolle et al. | 702/65 |
| 6,615,149 | B1 | 9/2003 | Wehrs | 702/76 |
| 6,629,059 | B2 | 9/2003 | Borgeson et al. | 702/183 |
| 6,654,697 | B1 | 11/2003 | Eryurek et al. | 702/47 |
| 6,701,274 | B1 | 3/2004 | Eryurek et al. | 702/140 |
| 6,754,601 | B1 | 6/2004 | Eryurek et al. | 702/102 |
| 6,772,036 | B2 | 8/2004 | Eryurek et al. | 700/127 |
| 6,832,175 | B2 * | 12/2004 | Adachi et al. | 702/177 |
| 6,859,755 | B2 | 2/2005 | Eryurek et al. | 702/183 |
| 6,889,166 | B2 | 5/2005 | Zielinski et al. | 702/183 |
| 6,907,383 | B2 | 6/2005 | Eryurek et al. | 702/183 |
| 6,912,484 | B2 * | 6/2005 | Bibelhausen et al. | 702/188 |
| 6,970,003 | B2 | 11/2005 | Rome et al. | 324/718 |
| 7,010,459 | B2 | 3/2006 | Eryurek et al. | 702/182 |
| 7,018,800 | B2 | 3/2006 | Huisenga et al. | 435/6 |
| 7,046,180 | B2 | 5/2006 | Jongsma et al. | 341/141 |
| 7,058,542 | B2 * | 6/2006 | Hauhia et al. | 702/183 |
| 7,260,487 | B2 * | 8/2007 | Brey et al. | 702/60 |
| 7,659,813 | B2 * | 2/2010 | Chambers et al. | 340/500 |
| 7,702,699 | B2 * | 4/2010 | Vazquez et al. | 707/804 |
| 7,706,938 | B2 * | 4/2010 | Palladino | 701/33 |
| 7,715,930 | B2 * | 5/2010 | Bush et al. | 700/26 |
| 7,953,501 | B2 * | 5/2011 | Zielinski et al. | 700/26 |
| 2002/0013639 | A1 | 1/2002 | Fujishima et al. | 700/175 |
| 2003/0144746 | A1 | 7/2003 | Hsiung et al. | 700/28 |
| 2004/0072239 | A1 | 4/2004 | Renaud et al. | 435/7.1 |
| 2004/0205182 | A1 * | 10/2004 | Geddes | 709/223 |
| 2004/0249583 | A1 | 12/2004 | Eryurek et al. | 702/47 |
| 2005/0011278 | A1 | 1/2005 | Brown et al. | 73/861.18 |
| 2005/0132808 | A1 | 6/2005 | Brown et al. | 73/592 |
| 2005/0240377 | A1 * | 10/2005 | Bibelhausen et al. | 702/188 |
| 2006/0095394 | A1 | 5/2006 | Miller et al. | 706/5 |
| 2006/0106469 | A1 * | 5/2006 | Huang et al. | 700/51 |
| 2006/0260697 | A1 * | 11/2006 | Lochtefeld et al. | 137/565.33 |
| 2007/0198215 | A1 * | 8/2007 | Bonanni et al. | 702/183 |
| 2008/0004841 | A1 * | 1/2008 | Nakamura | 702/186 |
| 2008/0052038 | A1 * | 2/2008 | Popivanov | 702/180 |

FOREIGN PATENT DOCUMENTS

| | | |
|---|---|---|
| EP | 1345182 A3 | 10/2003 |
| WO | WO 2005059476 A2 * | 6/2005 |

OTHER PUBLICATIONS

U.S. Appl. No. 11/238,674, filed Sep. 29, 2005; titled "Leak Detector for Process Valve".

"Notification of Transmittal of the International Search Report and the Written Opinion of the International Searching Authority, or the Declaration" for PCT/US2007/010915 filed May 4, 2007; 14 pages.

Official Communication from corresponding European Application No. EP 07794575.6, dated Mar. 31, 2009.

"Summons to Attend Oral Proceedings pursuant to Rule 115(1) EPC" from corresponding European Application No. EP 07794575.6, dated Apr. 6, 2010.

First Office Action from related Chinese Application No. 200780017797.4, dated Aug. 4, 2010.

* cited by examiner

DIAGNOSTICS IN PROCESS CONTROL AND MONITORING SYSTEMS

BACKGROUND OF THE INVENTION

The present invention relates to diagnostics of process control and monitoring systems for use with industrial processes. More specifically, the present invention relates to diagnostics which identify wear or degradation of components in industrial processes.

Process control devices are used in industrial process control systems to monitor and/or control a process. A control device is a field device which is used to control the process and includes pumps, valves, actuators, solenoids, motors, mixers, agitators, breakers, crushers, rollers, mills, ball mills, kneaders, blenders, filters, cyclones, centrifuges, towers, dryers, conveyors, separators, elevators, hoists, heaters, coolers and others. A process variable transmitter is a field device which is used to measure a process variable such as temperature, flow, pressure, turbidity, pH and others.

During operation of industrial processes, the various components used in the industrial process, or to control or monitor the industrial process, tend to degrade through continued use. Various diagnostic techniques have been utilized to identify a component prior to its ultimate failure so that the component can be replaced without interrupting normal operation of the process.

One technique used to replace components prior to failure is to identify a normal life span of the component. The component can then be replaced prior to the expiration of its expected life span.

SUMMARY

A method and apparatus for diagnosing condition of an industrial process is provided and includes obtaining a measured process variable. Process variable information related to a value of the measured process variable is determined. A histogram information is recalculated based upon the determined process variable information and time information related to a duration of time the measured process variable has a value. A condition of the industrial process is diagnosed based upon the calculated histogram information.

DETAILED DESCRIPTION

The present invention provides diagnostics for identifying wear or other degradation in industrial process components based upon an aggregate life span of the component. More specifically, the expected component life span is increased or decreased based upon the duration of time during which the component is exposed to different process conditions. With the present invention, the duration of time of the exposure is monitored and, along with a variable which quantizes the exposure, used to make a determination as to any increase or decrease in the expected lifetime of the component. In one example, a scaling factor is used to weight the exposure duration. In general, a histogram is created, which can be either a continuous or a discreet histogram, in which values of a measured process variable are correlated with a duration of time during which the process variable is at that value, or within a range of values. As a specific example, a particular section of piping may wear at a slow rate if the process fluid moves slowly through the pipe, but the wear rate may increase as the flow rate of the process fluid increases. Further, at higher levels of flow, the wear rate may actually begin to decrease as the flow becomes laminar. Thus, extended operations at either low flow rates or high flow rates may not shorten the life span of the process piping, while extended use at the median flow rates may significantly reduce life span.

Figure 1:
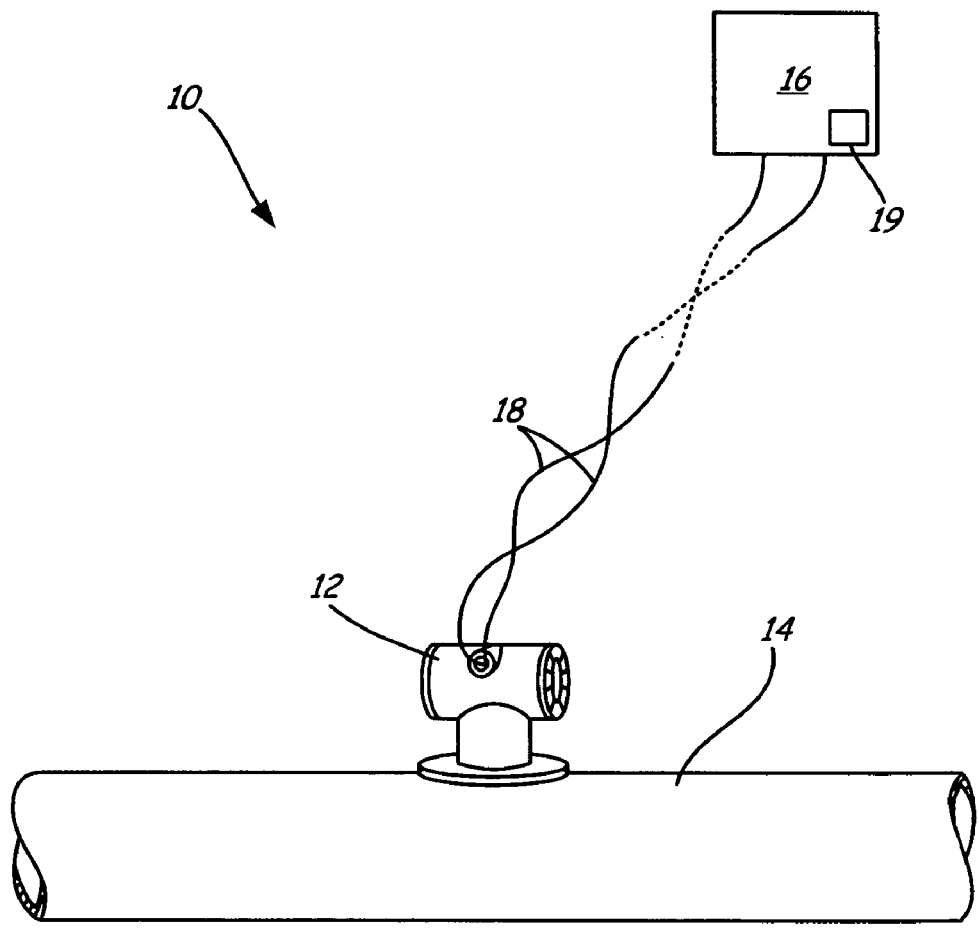
FIG. 1 is a simplified diagram showing a process control system in which the present invention can be implemented.

FIG. 1 is a simplified diagram showing a process control or monitoring system 10 which includes a process device 12 coupled to process piping 14. The process device 12 can be any type of process device such as a process variable transmitter, controller or a stand-alone device. Device 12 couples to a remote location such as process control room 16 over a two-wire process control loop 18. For example, loop 18 can comprise a 4-20 mA current loop that can also be used to power devices connected to the loop 18. Data can be carried on loop 18 in accordance with any appropriate protocol, for example, an analog current level which varies between 4 and 20 mA, the HART® communication protocol in which digital information is modulated upon a 4-20 mA current, a FieldBus or Profibus communication protocol, etc., including wireless communication techniques.

Figure 2:
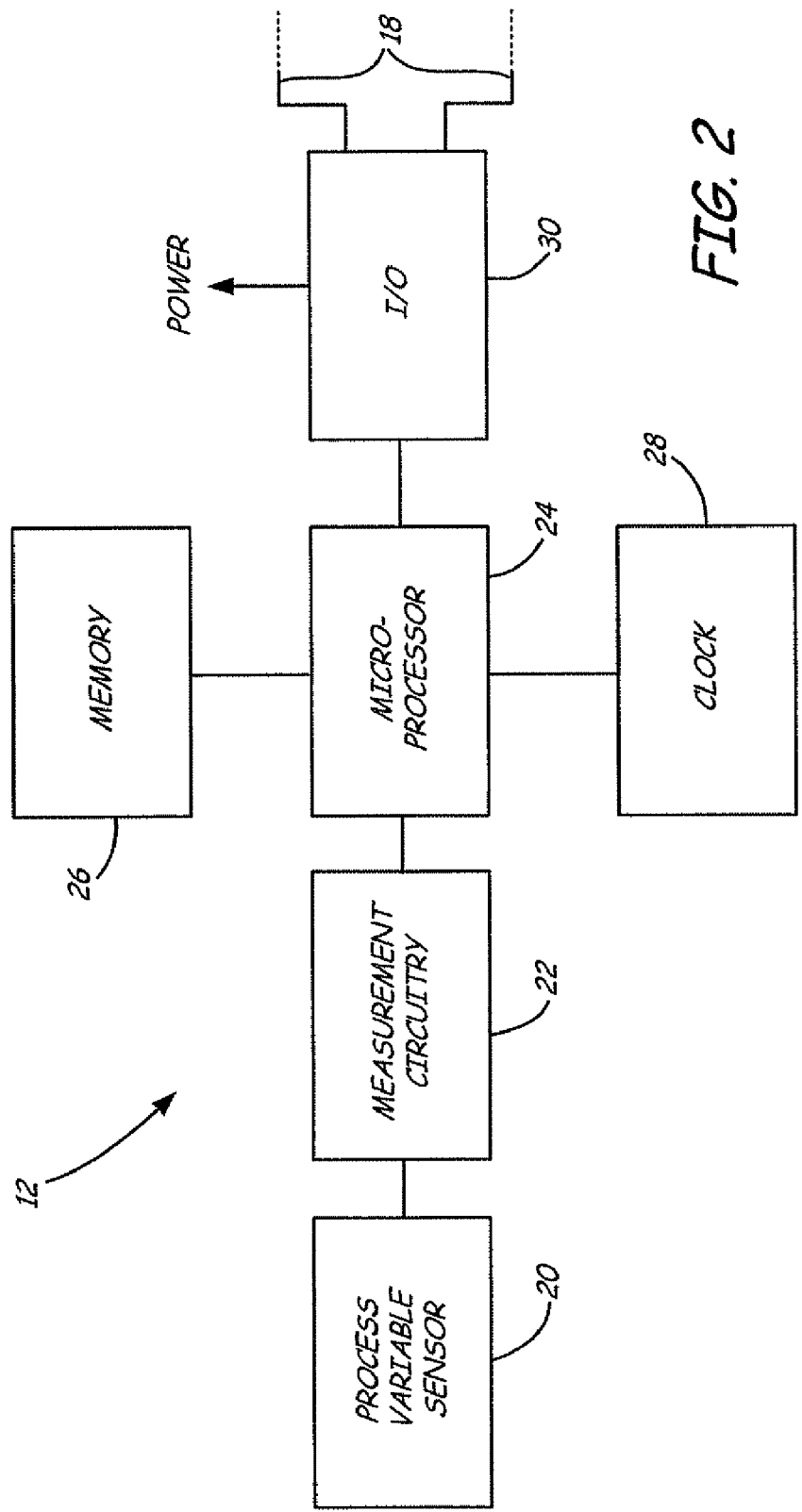
FIG. 2 is a simplified block diagram showing a process field device from FIG. 1.

FIG. 2 is a simplified block diagram of process device 12 illustrated as a process transmitter. Device 12 includes a process variable sensor 20 which is configured a measure a process variable of the industrial process. For example, process variables include flow, pressure, temperature, pH, etc. Measurement circuitry 22 couples to the process variable sensor and can be used to provide initial characterization to the sensed process variable. For example, the measurement circuitry can comprise an amplifier, an analog to digital converter, filters, etc. The sensed process variable is then provided to a microprocessor 24 or other digital controller which operates in accordance with instructions stored in, for example, in memory 26. Memory 26 can also be used for storing data or other information. Microprocessor 24 operates at a rate determined by clock 28. Input/output circuitry 30 is used to couple microprocessor 24 to process control loop 18. I/O 30 can be used by microprocessor to transmit information over loop 18. Similarly, in some configurations, I/O circuitry 30 can be used to provide information or commands to microprocessor 24. In some configurations, I/O circuitry 30 also provides a power output which is used to power circuitry of the process device 12.

Figure 3:
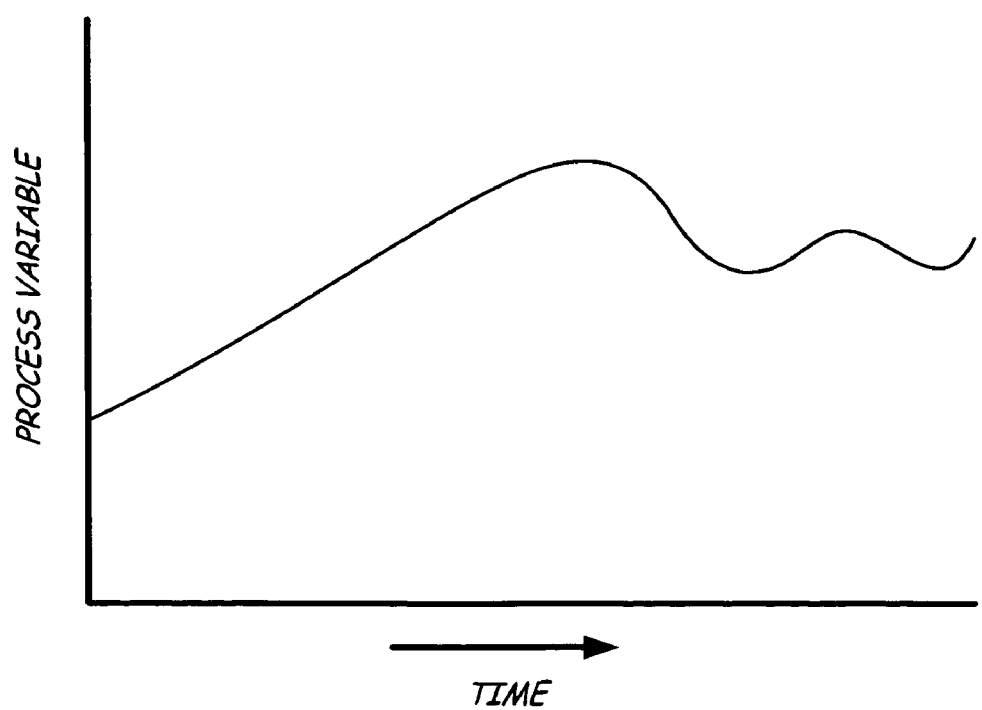
FIG. 3 is a graph of a process variable value versus time.

FIG. 3 is a graph of a process variable versus time. During operation of the industrial process, the sensed process variable changes depending on the state of the process. In some configurations, the sensed process variable can be controlled, for example, by adjusting a valve, controlling a heating element, etc.

Figure 4:
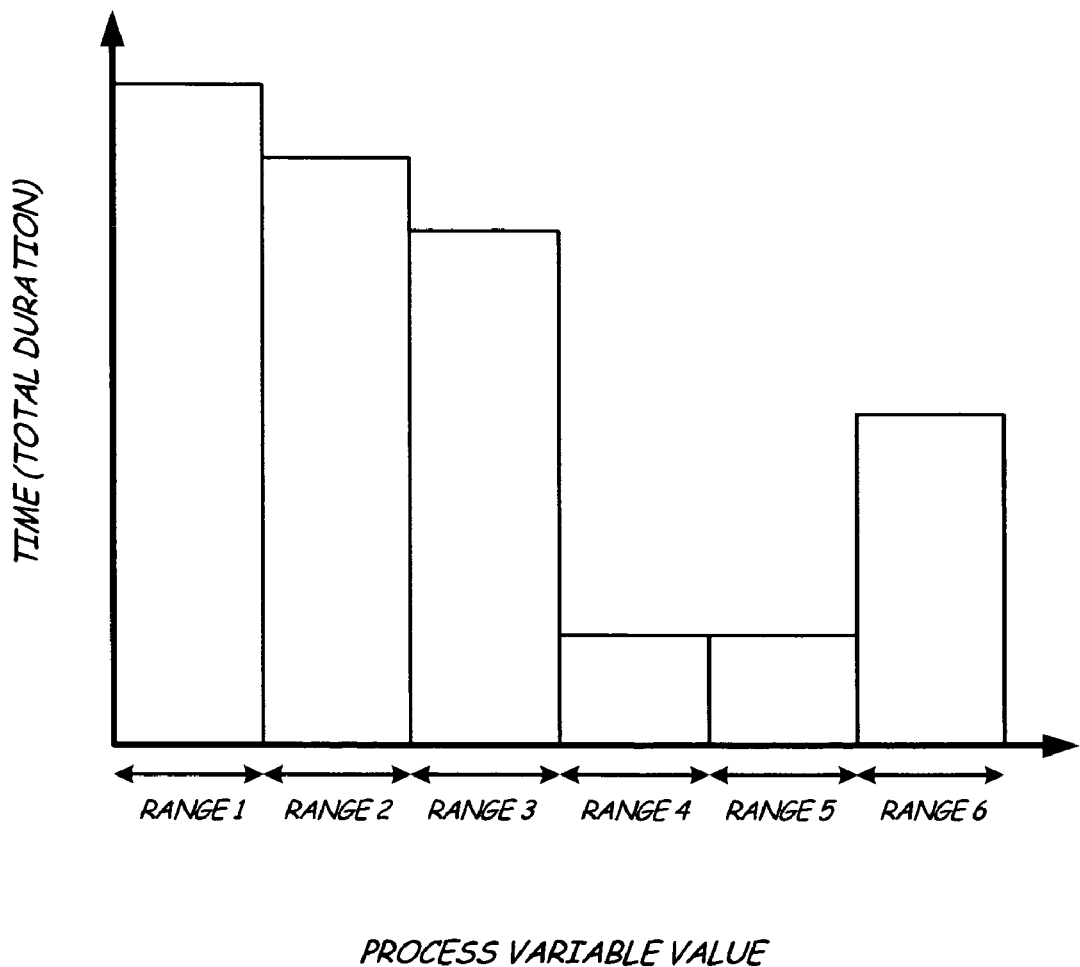
FIG. 4 is a graph of a time (total duration) versus a process variable value over a number of ranges illustrated as a histogram.

FIG. 4 is an example graph of a discreet histogram in which time (total duration) is plotted against the sensed process variable, where the sensed process variable has been divided into six different ranges. In such a configuration, each bar in the graph of FIG. 4 corresponds to the total amount of time that the sensed process variable (see FIG. 3) falls within a particular value range. In FIG. 4, the ranges are shown as being substantially the same width, however, the invention is not limited to such a configuration. Further, a continuous or substantially continuous histogram can be generated in which such ranges are not required. A continuous histogram is one in which the width of the ranges are zero. In order to generate a histogram, the microcontroller 24 shown in FIG. 2 monitors the sensed process variable. While the sensed variable falls within any of the ranges, the microprocessor records the total time (for example, using clock 28) and sums this value with any prior value for the particular range.

In general, a histogram refers to grouping of data into "bins" or "classes". Histograms are also referred to as the frequency distribution of data. If the frequency distribution is increased to a limiting case (and the width of the "bins" or "classes" is reduced to zero) so that the distribution is continuous, such a graph is also called the "frequency curve".

The frequency distribution data illustrated in FIG. 4 can be stored in memory 26 of process device 12 shown in FIG. 2, or can be calculated and/or stored at a remote location. For example, any process device 12 coupled to loop 18 can calculate and/or store the frequency distribution data. Similarly, control room 16 can include a controlled memory 19 for use in calculating or storing the data.

As discussed above, various components in industrial process can wear based upon prolonged exposure to elements of the process. For example, some components can erode when exposed to process fluid. Process piping, liners, couplings, sensors, etc., when placed in slurry flow will wear in a manner that is related to the flow velocity. In some cases, the rate of erosion due to abrasive wear increases exponentially with fluid flow. In other cases, the rate of erosion wear will initially decrease as the flow velocity increases and the particle distribution becomes homogenous.

With the present invention, a predictive diagnostic technique is provided in which a process variable is measured with respect to time. For example, the component wear can be predicted based upon a flow velocity histogram. In one aspect of the present invention, a process device stores the histogram data obtained over time. In one configuration, a flow transmitter stores a histogram of flow velocity taken over time. The histogram provides information indicative of the amount of time that the fluid has spent at each flow velocity class. This also allows an operator to adjust the control loop in order to optimize the process. This becomes particularly useful in control schemes where there is no digital communication to a host controller, such as some 4-20 mA control loops. Storing the measurement data in the process device, and generating the histogram in the device, can decrease the cost of implementation while increasing the accuracy. However, the invention is not limited to such configuration.

The present invention also includes the use of a scaling factor applied to a velocity range. The scaling factor may be discrete across the various ranges, or may be a continuous function. The scaling factor is used to adjust the wear rate of the component for a particular process variable value. The scaling factor is multiplied by the amount of time (duration) at each process variable value, and the result is used to calculate a total effective wear time.

Figure 5:
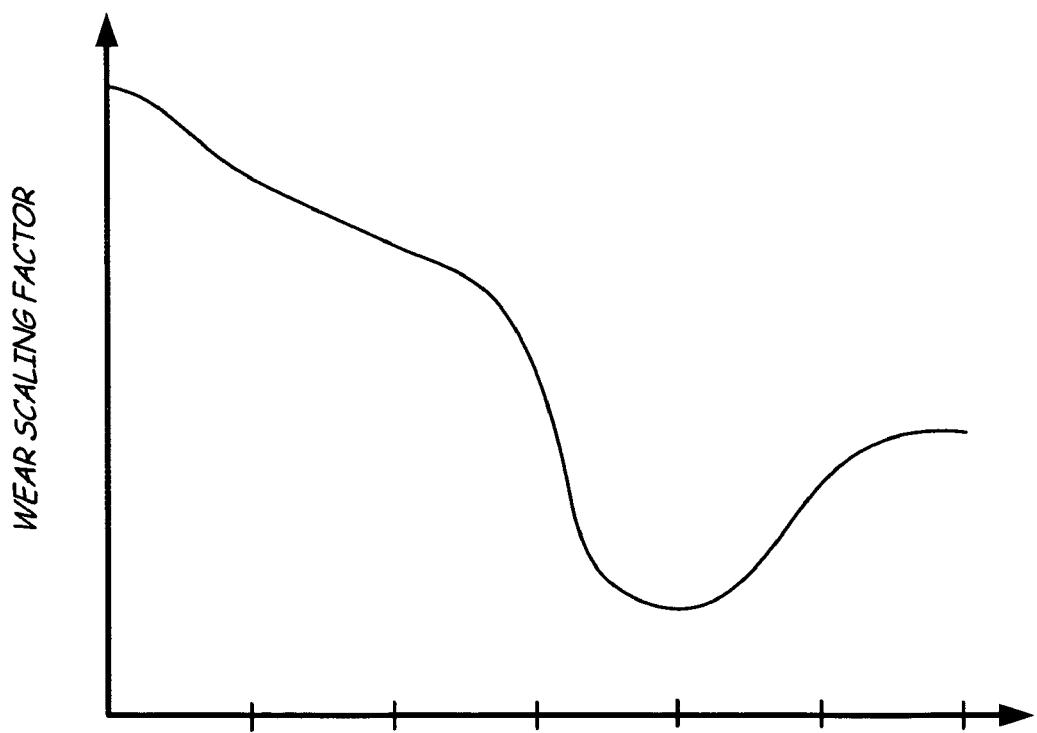
FIG. 5 is a graph of a wear scaling factor versus a process variable value.
Figure 6:
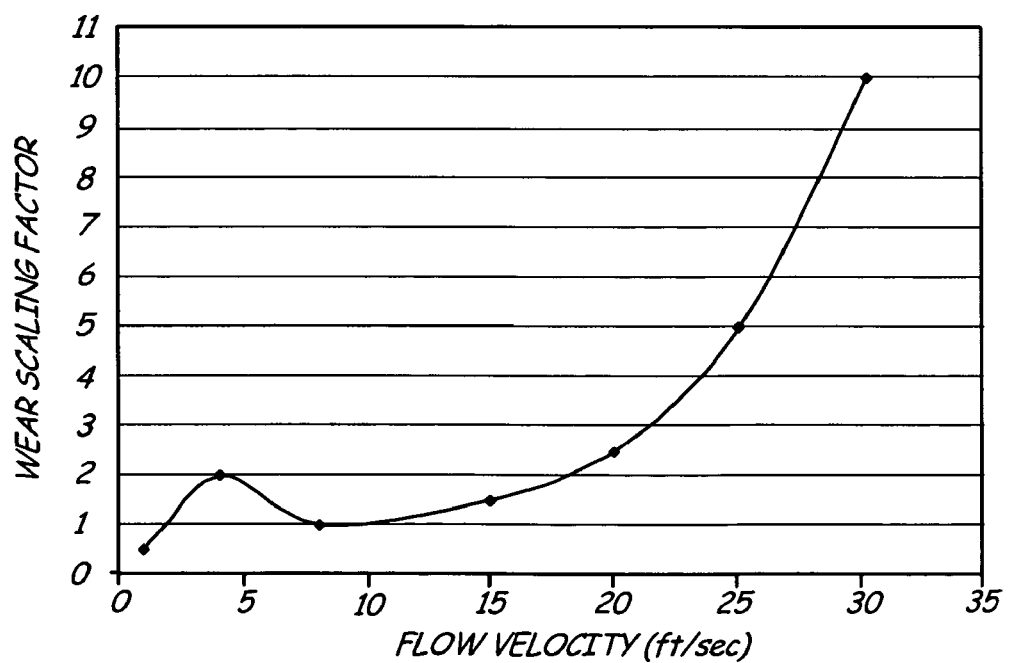
FIG. 6 is a graph of another wear scaling factor versus flow velocity in feet/second.

FIG. 5 is a graph of a continuous wear scaling factor versus a process variable value. In this particular configuration, the wear scaling factor has a relativity high value for a low value of a process variable. The wear scaling factor decreases to a minimum and then increases again as the process variable value extends higher. Similarly, FIG. 6 is a graph of a wear scaling factor versus flow velocity in feet/second for a slurry application with large particle sizes. The wear increases as the velocity rises to 4 feet/second and then starts to decrease as the particle distribution becomes more homogenous. This illustrates that the component wear rate is twice as fast at 4 feet/second as it is at 8 feet/second. In other words, the total effective wear time would increase twice as fast when the flow velocity is at 4 feet/second than when the flow velocity is at 8 feet/second. For example, if in a given installation, flow tube liners are required to be replaced after 6 months at a flow rate of 4 feet/second, that same flow tube liner will last for a year if the flow rate is at 8 feet/second.

Figure 7:
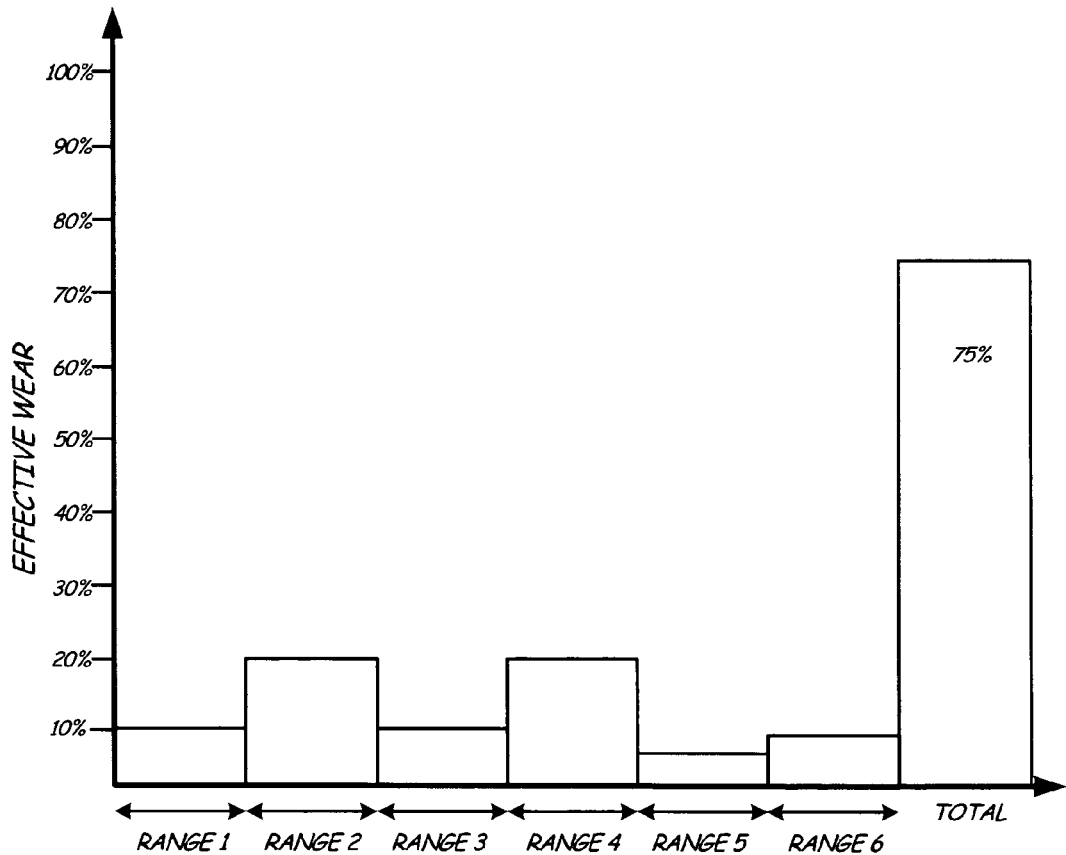
FIG. 7 is a histogram of effective wear versus process variable value for various ranges of the process variable along the total effective wear.

FIG. 7 is a graph of effective wear versus process variable value using the process variable value histogram illustrated in FIG. 4 and the wear scaling factor illustrated in FIG. 6. In the example of FIG. 7, the component should be replaced before the wear reaches 100 percent. The total effective wear is determined by summing the effective wear over all of the ranges. In the example of FIG. 7, the total effective wear is 75 percent. A trigger can be set such that when the effective wear reaches a desired threshold level, an alarm is provided indicating that the component needs replacement. This allows the component to be replaced prior to its ultimate failure. For example, the component can be replaced during process down times rather than performing emergency repairs and shutting the process down at inconvenient times.

Multiple trigger levels can be set to trigger based upon the effective wear of various components. Additionally, various components may have differing wear scaling factors. For example, the effective wear rate of a flow tube may differ from the effective wear rate of pumps, filters and other components in the industrial process. Individual trigger levels, accumulated wear time and flow histogram information are preferably stored in nonvolatile memory such as memory 26 shown in FIG. 2. Thus, if power is lost, the effective wear information can be recovered.

In the example of FIG. 7, the effective wear is illustrated as a percentage of the total lifetime of a component. However, the invention is not limited to such a configuration. The total effective wear can be displayed for reference and monitoring purpose and allow an operator to predict the end of life and elect to replace the component before its failure.

In one configuration, the invention can be implemented as a function block in accordance with a FieldBus protocol. The function block can be linked to any device or measurement variable. For example, an operator may have a profile of the maintenance schedule of a filter that is dependent upon the pH level of a fluid. The output from a pH process variable transmitter can be taken as an input to the function block and used to calculate the effective wear time of the filter. An alert is issued when the wear trigger level is reached. By performing the measurements and calculations in the field device, the host system is relieved of additional computation requirements. The host need simply monitor for any alerts or warnings generated by the measurement device indicating that an effective wear threshold has been exceeded.

Figure 8:
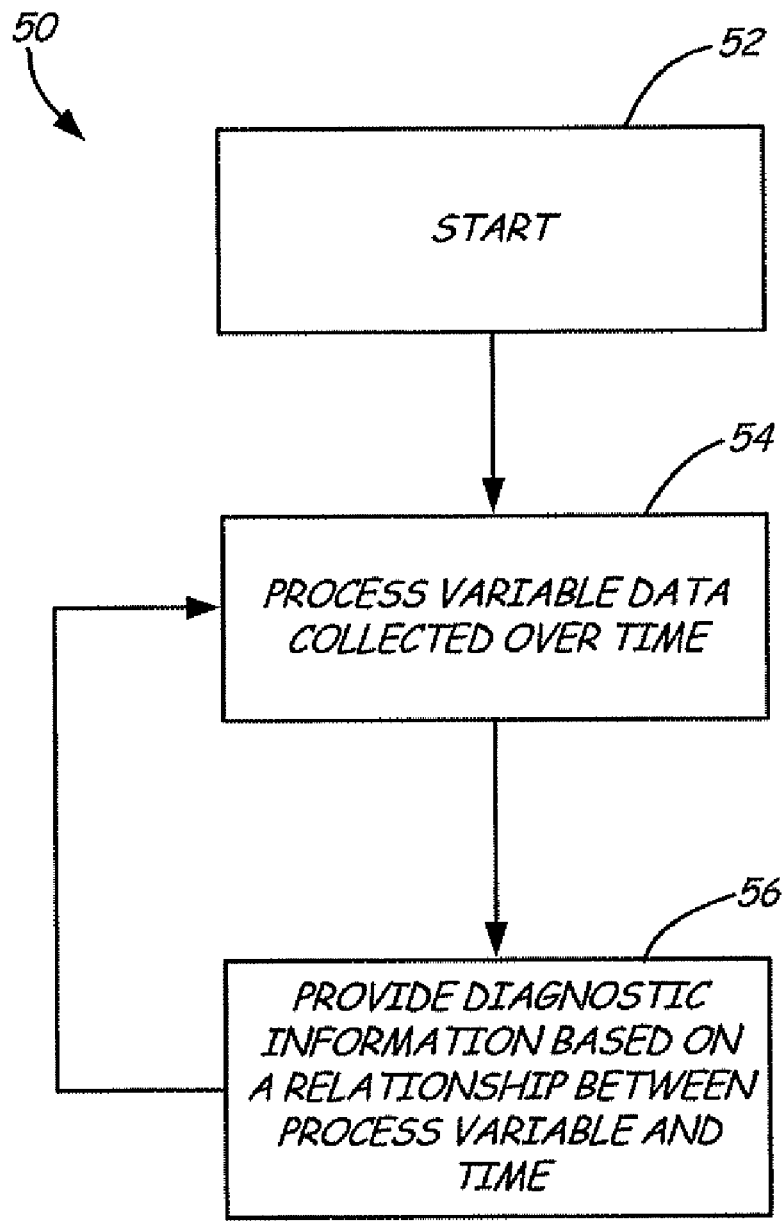
FIG. 8 is a simplified flow chart showing steps in accordance with the present invention.

FIG. 8 is an example flow chart 50 showing steps in accordance with the present invention. Flow chart 50 is initiated at start block 52 and process variable data is collected over time at block 54. At block 56, diagnostic information is provided based upon a relationship between the collected process variable information and time. Control is then passed back to block 54 for continued operation.

In addition to use in diagnosing the effective wear of components, the histogram determination discussed above can be used in other applications. For example, magnetic flow meters often operate under noisy conditions such as in slurry flows. This can result in an unstable flow. A typical prior art approach is to apply additional filtering to eliminate the noise. However, this reduces the response time of the system. The use of a flow histogram can be used to measure and display the variability of the system. For example, an operator can reset the histogram and run the process with a filter value having a one second response time. The same test is done again with a filter value of two seconds, etc. The results from the various tests can be compared and the decision made based upon the spread of the flow histogram data. The histogram provides an indication of the noise which is more accurate than attempting to evaluate the noise by monitoring real time flow data on a local display or even reading such data from a volt meter on an analog loop. Additionally, other techniques may require additional filtering or averaging that may result in noise which is hidden and could affect operation of the process control loop. The flow histogram data can be displayed on a local display thereby removing the need for digital communications.

The flow histogram information can also be used to monitor remote applications that are not actively controlled. One example is a waste water line. An operator can periodically visit the remote location and examine the histogram showing flow through the waste water line. The operator can then determine the maximum flow through the system to determine if the system is running at a level which is too close to its maximum capacity. It can also inform an operator if the flow is too slow and the line should be flushed to prevent buildup and blockages in the line.

In another example, the histogram information can be used to determine how frequently a flow line is not in use. This information can be obtained by determining the amount of time that the flow is at zero, divided by the total time.

To further enhance the total effective wear time calculation, other contributing factors can be taken into account. For example, the effective wear data illustrated in FIG. 7 can be a function of multiple variables such as the process temperature, pressure, chemical makeup of the process fluid, etc. The particular relationship between the effective wear and these other process variables can be calculated, for example, using a wear scaling factor tailored for the particular variable and particular component. These process variables can be retrieved locally or can be retrieved over the process control loop, for example from other HART® communication based devices, or through monitoring messages in order to obtain these secondary variables. FieldBus as well as wireless communication techniques can also be used to obtain such variables. The wear monitoring is applicable to any process instrument including pressure and temperature measurement devices, etc, and is not limited to flow measurement devices. Example process variables sensed by a process variable sensor or calculated from the output of such a sensor, include pressure, pH, temperature, turbidity, density (from which particulate size can be inferred), level, concentration of particular components, etc. The invention can be implemented in a host system such as in the control room 16 illustrated in FIG. 1. However, process variable measurements which are taken need to be communicated periodically to the host system.

Although the present invention has been described with reference to preferred embodiments, workers skilled in the art will recognize that changes may be made in form and detail without departing from the spirit and scope of the invention. The total effective wear of a component is the sum of all effective wears found either across a histogram range or the sum of a continuous histogram, i.e. a frequency distribution). Typically, when a component is replaced, the histogram information is reset and the process restarted. As used herein, the condition of the industrial process includes condition of any component within the industry process, including components which are local to the process device doing the diagnosing as well as components located remotely.

What is claimed is:

1. A method of diagnosing a condition of a component of an industrial process control system used to process a process fluid;

coupling a process variable transmitter field device to process piping of the industrial process;

the process piping carrying a process fluid;

measuring a process variable of the process fluid with the process variable transmitter field device, the process variable comprises flow velocity;

communicating the process variable to a control room over a process control loop;

calculating histogram information in the process variable transmitter field device based upon the measured process variable and time information related to a duration of time the measured process variable has a value, the histogram information comprising cumulative time durations during which the measured process variable has had a value within a plurality of ranges of values;

determining a total effective wear time of the component based upon the histogram information and a wear scaling factor applied to the histogram, wherein the total effective wear time is based upon an increasing and decreasing wear scaling factor which is non-monotonic with respect to increasing values of the measured process variable; and diagnosing, in the transmitter field device, a condition of the component of the industrial process based upon a comparison of the determined total effective wear time to a threshold wherein the diagnostic condition is indicative of wear.

2. The method of claim 1 including providing an alarm based upon the calculated histogram information.

3. The method of claim 1 and the calculated histogram information comprises discreet ranges.

4. The method of claim 1 and the calculated histogram information is continuous.

5. The method of claim 1 including displaying the calculated histogram information.

6. The method of claim 1 including resetting the histogram information when a component is replaced.

7. A field device which implements the method of claim 1 and coupled to the process control loop.

8. The method of claim 1 and the process control loop comprises a two-wire process control loop.

9. The method of claim 1 and the process control loop comprises a wireless process control loop.

10. The method of claim 1 and the wear scaling factor is a function of the process variable value.

11. The method of claim 1 and the measured process variable comprises flow rate and the diagnostic condition is indicative of wear.

12. The method of claim 1 wherein the total effective wear time is further a function of a wear scaling factor is continuous.

13. The method of claim 1 including applying a plurality of wear scaling factors to the histogram information using a plurality of thresholds to diagnose condition of additional components of the industrial process.

14. The method of claim 1 wherein the effective wear time is further a function of a plurality of process variables.

15. A process variable transmitter for use in measuring a process variable in an industrial process, comprising:
- a process variable sensor which couples to a process fluid of the industrial process and provides a sensor output related to a process variable of the process fluid;
- measurement circuitry coupled to the process variable sensor which provides a process variable output as a function of the sensor output;
- output circuitry coupled to the measurement circuitry which provides a transmitter output on a process control loop related to the process variable output;
- diagnostic circuitry that monitors magnitude of the sensor output and time, and increments a first stored value stored in a memory in response to a duration of time during which the sensor output magnitude is within a first magnitude range and increment a second value stored in the memory in response to a duration of time during which the sensor output magnitude is within a second magnitude range and responsively calculate a total effective wear time of the component and thereby determine a diagnostic condition of a component of the industrial process based upon a comparison of the total effective wear time and a threshold wherein the total effective wear time is based upon an increasing and decreasing wear scaling factor which is non-monotonic with respect to increasing values of the sensor output.

16. The apparatus of claim 15 wherein the diagnostic circuitry provides an alarm based upon the determined condition.

17. The apparatus of claim 15 wherein the ranges comprise discreet ranges.

18. The apparatus of claim 15 wherein the ranges are continuous.

19. The apparatus of claim 15 including a display to display calculated histogram information.

20. The apparatus of claim 15 wherein the stored values are reset when a component is replaced.

21. The apparatus of claim 15 wherein the process control loop comprises a two-wire process control loop.

22. The apparatus of claim 15 wherein the process control loop comprises a wireless process control loop.

23. The apparatus of claim 15 and the wear scaling factor is a function of the process variable value.

24. The apparatus of claim 15 and the process variable comprises flow rate and the diagnostic.

25. The apparatus of claim 15 wherein the total effective wear time is further a function of a wear scaling factor is continuous.

26. The apparatus of claim 15 wherein the diagnostic circuitry applies a plurality of wear scaling factors to the histogram information using a plurality of thresholds to diagnose condition of additional components of the industrial process.

27. The apparatus of claim 15 wherein the effective wear time is further a function of a plurality of process variables.

28. A method of diagnosing a condition of a component in an industrial process control system used to process a process fluid comprising:
- coupling a process variable transmitter to process piping of the industrial process, the process piping carrying the process fluid;
- placing a process variable sensor in the process fluid which responsively provides a sensor output related to a process variable in the process fluid;
- measuring the process variable of the process fluid in response to the sensor output;
- communicating the measured process variable to a control room over a process control loop;
- incrementing a first counter stored in a memory based upon a duration of time during which a magnitude of the sensor output is within a first magnitude range;
- incrementing a second counter stored in the memory based upon a duration of time during which the sensor output has a magnitude within a second magnitude range;
- determining a total effective wear time of the component based upon the first and second magnitudes; and
- diagnosing condition of the component of the industrial process based upon a comparison of the total effective wear time and a threshold wherein the total effective wear time is based upon a an increasing and decreasing wear scaling factor which is non-monotonic with respect to increasing values of the process variable.

29. The method of claim 28 wherein the total effective wear time is further a function of a wear scaling factor is continuous.

30. The method of claim 28 including applying a plurality of wear scaling factors to diagnose condition of additional components of the industrial process.

31. The method of claim 28 wherein the effective wear time is further a function of a plurality of process variables.

* * * * *